(12) United States Patent  (10) Patent No.: US 8,654,182 B2
Ishikawa et al.  (45) Date of Patent: Feb. 18, 2014

(54) DISPLAY DEVICE AND CONTROL METHOD OF DISPLAY DEVICE

(75) Inventors: Takanori Ishikawa, Saitama (JP); Kazunari Yoshifuji, Tokyo (JP); Yota Komoriya, Tokyo (JP); Isao Ohashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 334 days.

(21) Appl. No.: 13/067,636

(22) Filed: Jun. 16, 2011

(65) Prior Publication Data

US 2011/0316985 A1     Dec. 29, 2011

(30) Foreign Application Priority Data

Jun. 24, 2010  (JP) ................. P2010-143866

(51) Int. Cl.
  *H04N 13/04*     (2006.01)
(52) U.S. Cl.
  USPC ............ 348/51; 348/42; 348/46; 348/54; 348/E13.001; 348/E13.074; 382/117; 382/154
(58) Field of Classification Search
  None
  See application file for complete search history.

(56) References Cited

U.S. PATENT DOCUMENTS

| | | | |
|---|---|---|---|
| 4,987,487 A * | 1/1991 | Ichinose et al. | 348/59 |
| 5,986,804 A * | 11/1999 | Mashitani et al. | 359/462 |
| 2002/0054430 A1 * | 5/2002 | Takikawa et al. | 359/462 |
| 2003/0044073 A1 * | 3/2003 | Matsugu et al. | 382/195 |
| 2005/0146787 A1 * | 7/2005 | Lukyanitsa | 359/462 |
| 2005/0232510 A1 * | 10/2005 | Blake et al. | 382/275 |
| 2006/0193509 A1 * | 8/2006 | Criminisi et al. | 382/154 |
| 2008/0112616 A1 * | 5/2008 | Koo et al. | 382/171 |
| 2008/0199070 A1 * | 8/2008 | Kim et al. | 382/154 |
| 2008/0240549 A1 * | 10/2008 | Koo et al. | 382/154 |
| 2008/0292144 A1 * | 11/2008 | Kim | 382/117 |
| 2009/0041309 A1 * | 2/2009 | Kim et al. | 382/117 |
| 2009/0079818 A1 * | 3/2009 | Saishu et al. | 348/51 |
| 2010/0231689 A1 * | 9/2010 | Bruls et al. | 348/43 |
| 2012/0084652 A1 * | 4/2012 | Martinez Bauza et al. | 715/719 |

FOREIGN PATENT DOCUMENTS

JP    2000-047139    2/2000

* cited by examiner

*Primary Examiner* — Christopher S Kelley
*Assistant Examiner* — Kaitlin A Retallick
(74) *Attorney, Agent, or Firm* — Rader, Fishman & Grauer PLLC

(57) ABSTRACT

There is provided a display device including a display unit which periodically arranges and displays a plurality of images and a parallax barrier which is disposed in front of a pixel plane of the display unit and separates light from the display unit. The display device includes a disparity extraction unit which extracts information on a distribution of disparities between the view images, a parameter calculation unit which calculates a shift amount based on the disparity distribution information, a shift processing unit which performs shift processing on at least one of the view images based on the calculated shift amount, and a mapping processing unit which rearranges the at least one shift-processed view image on the display unit.

25 Claims, 10 Drawing Sheets

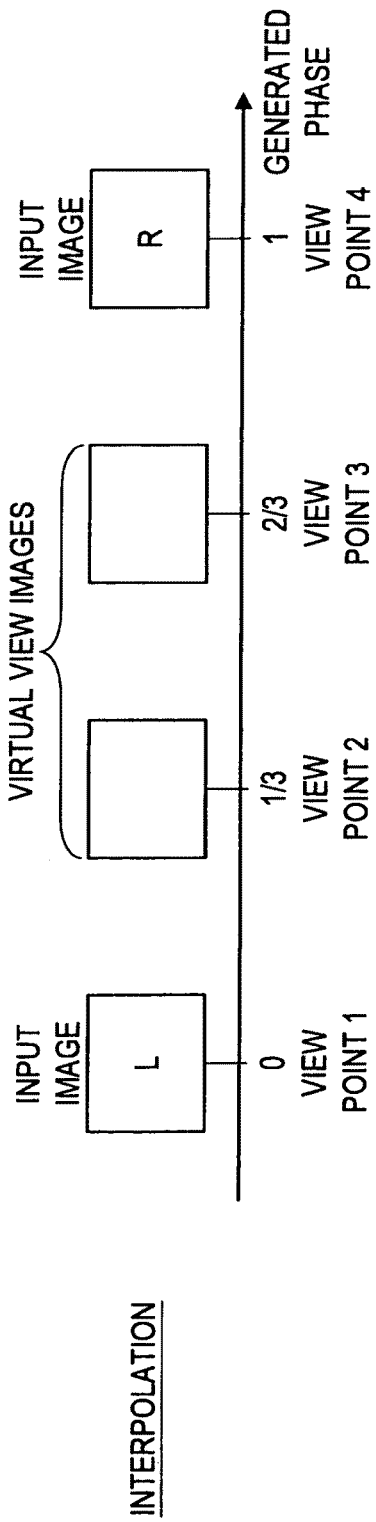

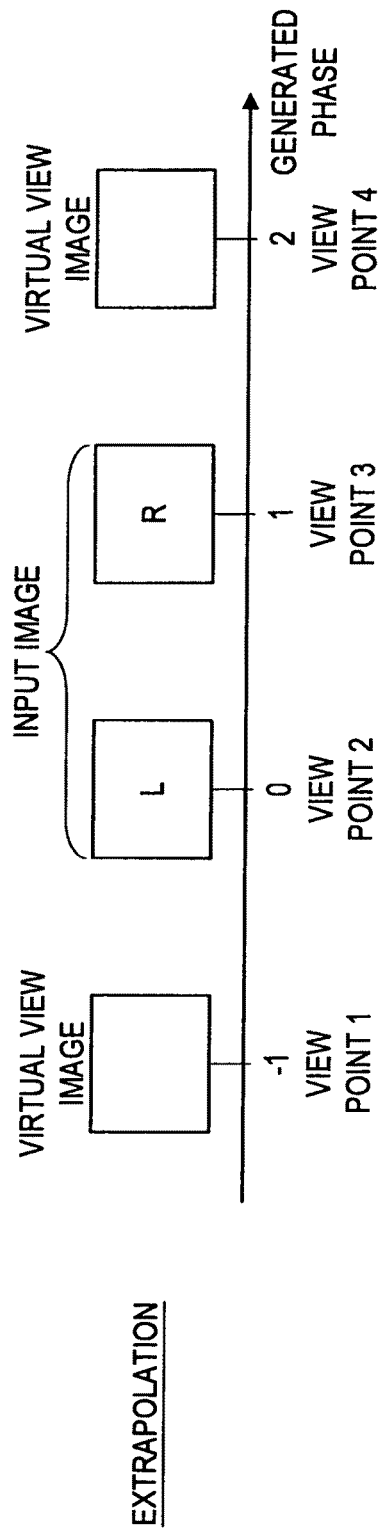

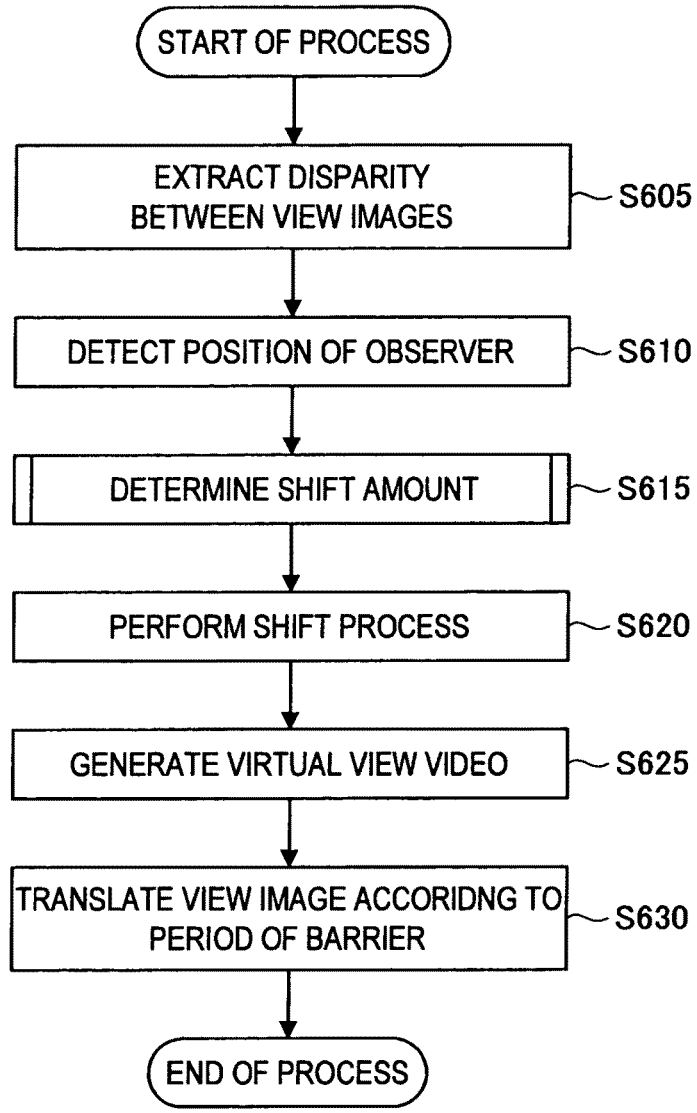

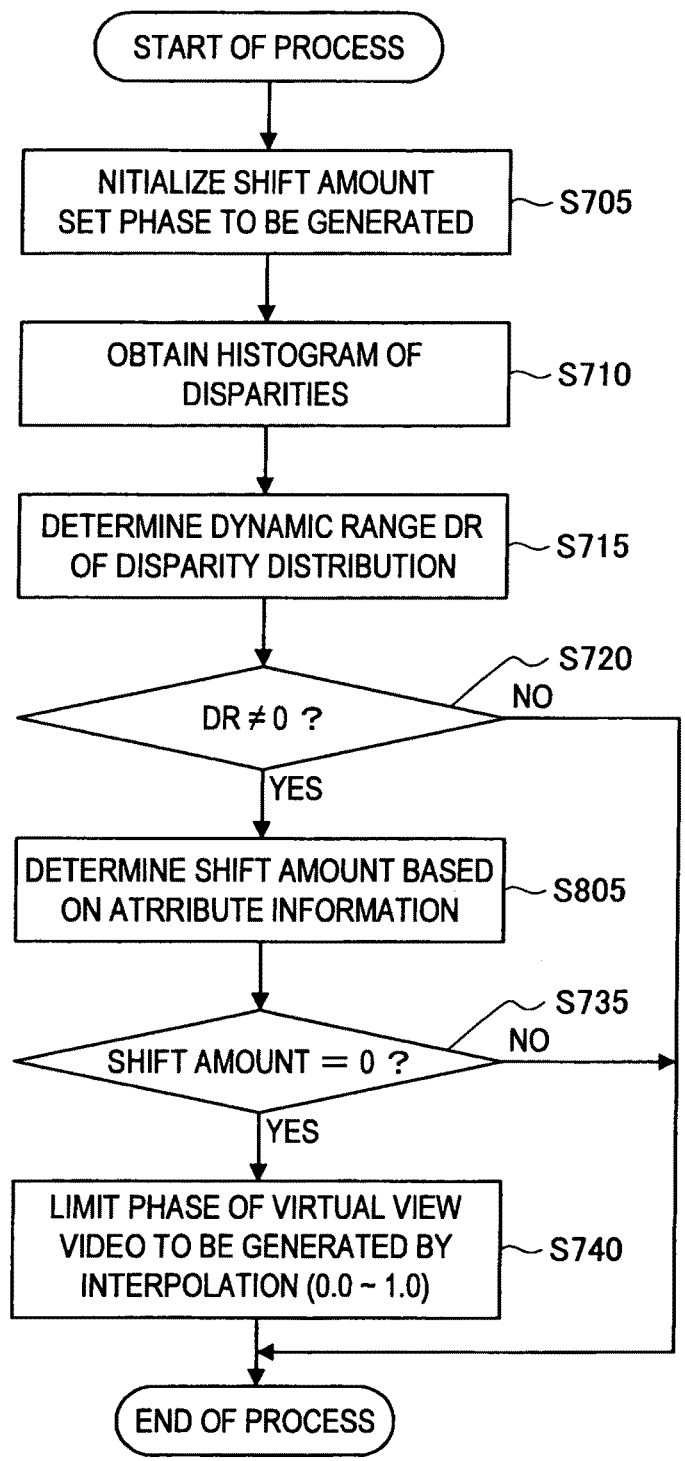

DISPLAY DEVICE AND CONTROL METHOD OF DISPLAY DEVICE

BACKGROUND

The present disclosure relates to a display device that enables viewing of a video and a control method of the display device.

Generally, two videos constituted from a video for a right eye and a video for a left eye are necessary for viewing a stereoscopic video. Among methods of presenting a stereoscopic image, there is proposed a method of using polarization glasses or a method of using a parallax barrier or a lenticular lens without using the glasses, for example. In the former method, view images (or disparity images) are seen using the glasses, based on polarization states that are mutually different between the right and left eyes. In the latter method, prescribed view images among a plurality of view images are guided to a viewer using the parallax barrier or the lenticular lens. A stereoscopic display device using the parallax barrier is so configured that videos formed by light rays which have passed through apertures (transmissive units) of the parallax barrier are different view images for the right and left eyes.

While an autostereoscopic display device has an advantage that stereoscopic viewing is possible without using special glasses, it has the following issue. As mentioned above, view images (views 1, 2, 3, 4, 1, 2, 3, 4, . . . in FIG. 1) are periodically arranged in pixels on a liquid crystal display. For this reason, at the boundary of the respective periods, or the border of the period of four video data (the view 4 and the view 1), a pseudoscopic zone is present. In the pseudoscopic zone, a view video to be entered into a right eye is guided to a left eye, and a view video to be entered into the right eye is guided into the left eye. In the pseudoscopic zone, a pseudoscopic phenomenon occurs. That is, a viewer perceives a stereoscopic video image of which the front and the back are inverted or sees unnaturally blending of the front and the back of the stereoscopic video image. This phenomenon gives an unnatural feeling to the viewer.

There has been proposed an attempt to remove discomfort of a viewer against pseudoscopy as much as possible (refer to JP 2000-47139A, for example). In the method in JP 2000-47139A, the position of a viewer is detected, and a pattern shape of a mask pattern of an optical modulator corresponding to the parallax barrier is changed based on information on the position, thereby reducing the discomfort of the viewer against the pseudoscopy.

SUMMARY

However, in the method in JP 2000-47139A, devices such as a high-precision detection device and a high-precision optical modulator are necessary. Thus, this method is very expensive in terms of maintenance and cost. Further, the pseudoscopy occurs in the autostereoscopic display in principle. Thus, it is difficult to ultimately solve the problem caused by the pseudoscopy. Accordingly, a substantial solution to the problem is to reduce the discomfort against the pseudoscopy as much as possible without using the special devices. Further, when a disparity value of a stereoscopic video is large in an orthoscopic zone as well as a pseudoscopic zone, a viewer may suffer from accumulation of fatigue depending on a level of advancement of the stereoscopic video from a display surface. The degree of the fatigue is greatly different individually between female and male, between child and adult, or the like.

In light of the foregoing, it is desirable to provide a display device and a control method of the stereoscopic display device, which are novel and improved, and which are capable of reducing a feeling of fatigue and discomfort when viewing a stereoscopic video by disparity adjustment.

According to an embodiment of the present disclosure, there is provided a display device including a display unit which periodically arranges and displays a plurality of images and a light separating unit which is disposed in front of a pixel plane of the display unit and separates light from the display unit, the display device comprising: a disparity extraction unit which extracts information on distribution of disparities between the view images; a parameter calculation unit which calculates a shift amount based on the information on the distribution of the disparities; a shift processing unit which performs shift processing on at least one of the view images based on the calculated shift amount; and a mapping processing unit which rearranges the shift-processed view image on the display unit.

The parameter calculation unit may calculate a mean value of the disparities for respective pixels included in a screen of the display unit, based on the information on the distribution of the disparities, as the shift amount.

The parameter calculation unit may calculate a disparity value by which the number of pixels of an image perceived to be located in front of the display unit is substantially equal to the number of pixels of the image perceived to be located behind the display unit, based on the information on the distribution of the disparities, as the shift amount.

The parameter calculation unit may calculate a value obtained by weighting the calculated shift amount according to the area of an object within the view images, as the shift amount.

The display device may further include a detection unit which detects information on a position of an observer based on face recognition of the observers; the parameter calculation unit calculating the shift amount based on the information on the distribution of the disparities and the information on the position of the observer.

The parameter calculation unit may calculate the shift amount when it is determined that at least one observer is located in a pseudoscopic zone, from the detected the information on the position of the observer.

The display device may further include a detection unit which detects information on attributes of an observer based on face recognition of the observer; the parameter calculation unit calculating the shift amount based on the information on the distribution of the disparities and the information on the attributes of the observer.

The parameter calculation unit may determine a phase to be generated of a virtual view image, based on the calculated shift amount.

when the calculated shift amount is equal to or larger than a predetermined value, the parameter calculation unit may determine the phase to be generated of the virtual view image so that the virtual view image is generated between an image for a right eye and an image for a left eye of the shift-processed view image, by interpolation.

The parameter calculation unit may determine the phase to be generated of a virtual view image based on the information on the position of the observer.

According to another embodiment of the present disclosure, there is provided a display device that includes a light source, a display unit which periodically arranges and displays a plurality of view images, and a light separating unit which is disposed between the display unit and the light source and separates light from the light source, the display device including a disparity extraction unit which extracts information on a distribution of disparities between the view images; a parameter calculation unit which calculates a shift amount based on the extracted information on the distribution of disparities; a shift processing unit which performs shift processing on at least one of the view images, based on the calculated shift amount; and a mapping processing unit which rearranges the shift-processed view image.

According to another embodiment of the present disclosure, there is provided a display device including a display unit which periodically arranges and displays a plurality of view images; a detection unit which detects information on a position of an observer; a parameter calculation unit which calculates a shift amount based on the information on the position; and a shift processing unit which performs shift processing on at least one of the view images based on the calculated shift amount.

According to another embodiment of the present disclosure, there is provided a display unit which periodically arranges and displays a plurality of view images; a detection unit which detects information on attributes of an observer; a parameter calculation unit which calculates a shift amount based on the information on the attributes; and a shift processing unit which performs shift processing on at least one of the view images based on the calculated shift amount.

According to another embodiment of the present disclosure, there is provided a control method of a display device that includes a display unit which periodically arranges and displays a plurality of images and a light separating unit which is disposed in front of a pixel plane of the display unit and separates light from the display unit, the control method including extracting information on a distribution of disparities between the view images; calculating a shift amount based on the information on the distribution of the disparities; performing shift processing on at least one of the view images based on the calculated shift amount; and rearranging the shift-processed view image on the display unit.

As described above, according to embodiments of the present disclosure, a feeling of fatigue or discomfort caused by viewing a video may be relieved by disparity adjustment.

BRIEF DESCRIPTION OF THE DRAWINGS

FIG. 5A is a diagram for explaining a generated phase for virtual view image generation (by interpolation) according to the first and second embodiments;

FIG. 5B is a diagram for explaining a generated phase for virtual view image generation (by extrapolation) according to the first and second embodiments;

FIG. 6 is a diagram showing a process flow of the stereoscopic display device according to the first and second embodiments;

FIG. 8 is a diagram showing a process flow of a parameter calculation unit according to the second embodiment.

DETAILED DESCRIPTION OF THE EMBODIMENT(S)

Figure 1:
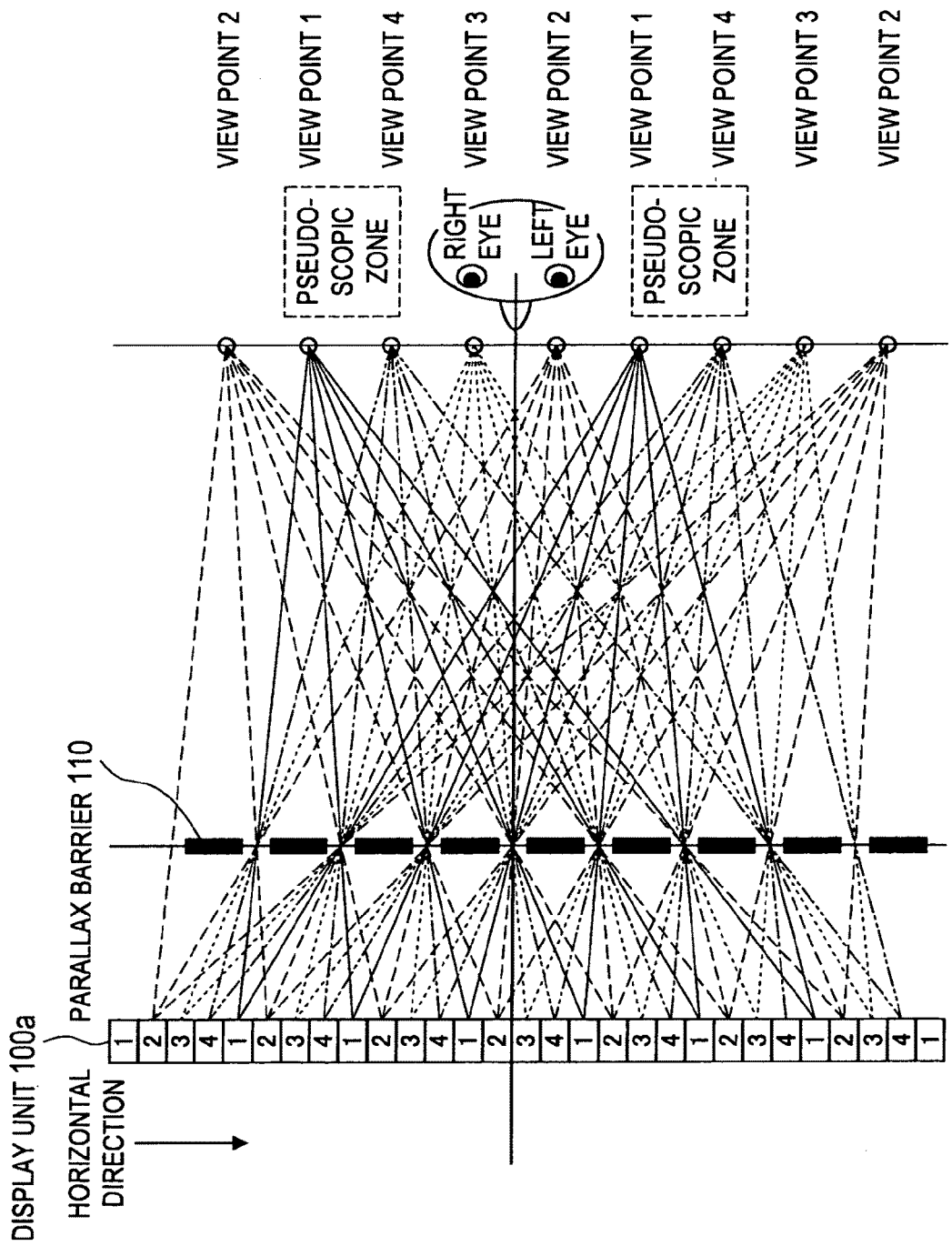
FIG. 1 is a schematic structure diagram of a stereoscopic display device using a parallax barrier according to first and second embodiments of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The embodiments of the present disclosure will be described in the following order:

First Embodiment

Schematic Structure of Stereoscopic Display Device (Pseudoscopy)
(Disparity)
 [Functional Structure of Stereoscopic Display Device]
 [Operation of Stereoscopic Display Device]
(Overall Operation)
(Operation of Parameter Calculation Unit)

Second Embodiment

Functional Structure of Stereoscopic Display Device

[Operation of Stereoscopic Display Device]
(Operation of Parameter Calculation Unit)

Stereoscopic display devices according to first and second embodiments will be described below. The following description is based on the assumption that the stereoscopic display device according to each embodiment is an autostereoscopic display device. Characteristics of a plurality of view images of a stereoscopic video displayed on the autostereoscopic display device are analyzed, and shift processing is performed on the view images based on the characteristics, thereby reducing a feeling of fatigue and discomfort when the stereoscopic video is viewed. The autostereoscopic display device in each embodiment, which will be described below, includes a display unit which periodically arranges and displays a plurality of view images and a light separating unit which separates light from the display unit. When the display unit is a self light emission panel, no light source is necessary. When the display unit is a liquid crystal panel or the like which needs a light source, the optical separation unit may be positioned between the light source and the liquid crystal panel.

First Embodiment

Schematic Structure of Stereoscopic Display Device

First, a schematic structure of a stereoscopic display device according to the first embodiment of the present disclosure will be described with reference to FIG. 1. FIG. 1 is a top view of the stereoscopic display device using a parallax barrier. FIG. 1 illustrates pixels in the horizontal direction of a liquid crystal display of an autostereoscopic display device 100 on the page of FIG. 1. In the case of a display unit 100a of FIG. 17 with four points of views, four view images are divided vertically on the page of FIG. 1 and arranged periodically at the respective pixel positions of the display unit 100*a*. Light from a light source, not shown, is supplied to the display unit 100*a*, and a parallax barrier 110 having apertures is placed in front of the display unit 100*a*, so that the view images 1 to 4 are spacially separated from one another. With this arrangement, an image for a right eye and an image for a left eye can be thereby seen by the right eye and the left eye, respectively. Note that, use of a lenticular lens instead of the parallax barrier 110 also allows separation of videos for the right eye and the left eye with no glasses. A mechanism that separates light from the display unit 100*a*, such as the parallax bather or the lenticular lens, is also referred to as a light separating unit.

In this case, the parallax barrier 110 and the image have the same period. If a view video for the left eye is guided to the left eye and a view video for the right eye is guided to the right eye in a correct manner, a correct stereoscopic image can be seen. Referring to FIG. 1, because a view 2 enters the left eye, and a view 3 enters the right eye, a correct video can be seen. (Pseudoscopy)

As described above, the autostereoscopic display device has an advantage that enables stereoscopic viewing without the need for special glasses. However, as described above, because a plurality of view images are periodically arranged in the respective pixels of the stereoscopic display 100*a*, a pseudoscopic zone where a view video to enter the right eye is guided to the left eye and a view video to enter the left eye is guided to the right eye exists at the boundary between the periods. For example, because view images are periodically arranged like 1, 2, 3, 4, 1, 2, 3, 4, . . . in FIG. 1, the border of the period of four video data (the view 4 and the view 1) serve as the pseudoscopic zone where a view video to enter the right eye is guided to the left eye and a view video to enter the left eye is guided to the right eye. In the pseudoscopic zone, a pseudoscopic phenomenon occurs. That is, a viewer perceives a stereoscopic video image of which the front and the back are inverted or look unnaturally blended. This phenomenon gives an unnatural feeling and discomfort to the viewer.

[Disparity]

A relationship between a stereoscopic video and a disparity will be described using FIG. 2. As described above, a view image for the right eye and a view image for the left eye are respectively guided to the right eye and the left eye, using the light separating unit constituted from a disparity element such as the parallax barrier or the lenticular lens. In this embodiment, the parallax barrier 110 is placed in front of a pixel plane of the display unit 100*a* of the stereoscopic display device 100. Since the viewer sees a video through the parallax barrier 100, only an image for the right eye enters the right eye, and only an image for the left eye enters the left eye in an orthoscopic zone. A video seen by the right eye and a video seen by the left eye are different in this manner. A video shown on the display unit 100*a* thereby looks stereoscopic.

Figure 2:
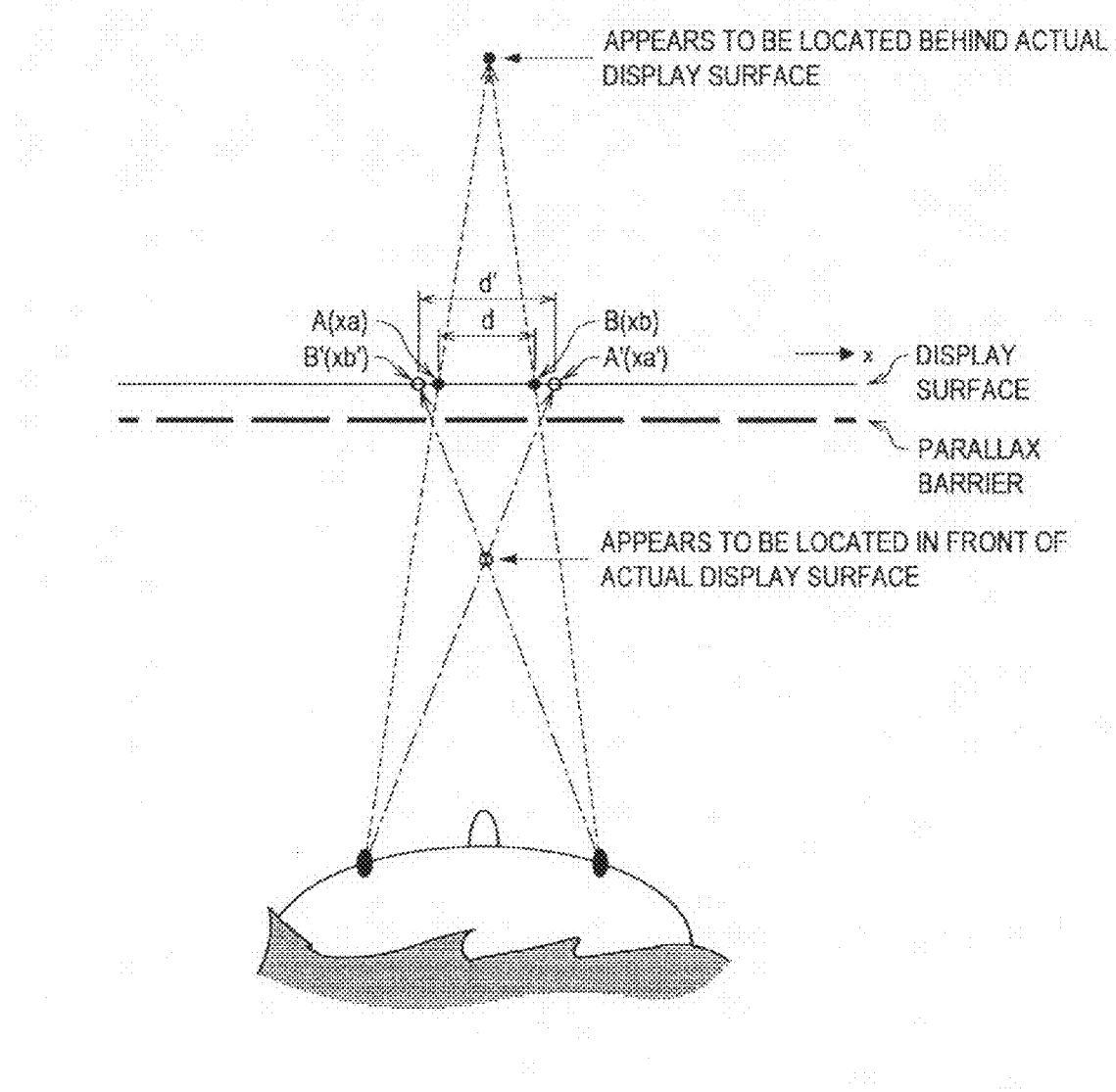
FIG. 2 is a conceptual diagram for explaining a relationship between a disparity value and a stereoscopic image.

Referring to FIG. 2, a view image guided to a left eye at a certain time t is indicated by a point A, while a view image guided to a right eye at the certain time t is indicated by a point B. Further, a view image guided to the left eye at another time t' is indicated by a point A', while a view image guided to the right eye at the another time t' is indicated by a point B'. A difference (Xb−Xa) from a coordinate Xa of the point A to a coordinage Xb of the point B on an X axis is a disparity d at the time t. A difference (Xb'−Xa') from a coordinate Xa' of the point A' to a coordinate Xb' of the point B' on the x axis is a disparity d' at the time t'.

The larger the disparity d (or d') is, the more a degree at which an image appears to recede from an actual display surface or a degree at which the image appears to advance from the actual display surface increases. The disparity d has a sign, and the image appears to be located in front of or behind the actual display surface according to a difference of the sign. When scanning is performed on the x axis from the left to the right as shown on the page of FIG. 2, the disparity d (=Xb−Xa) at the time t has a positive sign. In this case, a video obtained by this scanning appears to recede from the display surface. On the other hand, the disparity d' (=Xb'−Xa') at the time t' has a minus sign. In this case, a video obtained by this scanning appears to advance from the display surface. Accordingly, by adjusting the disparity to recreate a state of a stereoscopic image in a direction perpendicular to the display surface, a degree at which a stereoscopic image seemingly advances or recedes from the display surface may be changed.

In the pseudoscopic zone in particular, the pseudoscopy occurs in which the viewer perceives a stereoscopic image of which the front and the back are inverted or look unnaturally mixed. This pseudoscopy gives an unnatural feeling and discomfort to the viewer. The pseudoscopy occurs in the autostereoscopic display device in principle. Thus, it is difficult to ultimately solve the problem caused by the pseudoscopy. Accordingly, this embodiment proposes a method in which, by adjusting the disparity to change a degree at which a stereoscopic image seemingly advances or recedes from the actual display surface, discomfort caused by the pseudoscopy is reduced. A specific function and a specific operation of the stereoscopic display device 100 according to this embodiment will be described in detail.

A video signal may represent a stereo image (constituted from two view images), or N view images not less than two view images. In this embodiment, one frame is treated as one screen. Alternatively, one field may be treated as one screen. In the following description, it is assumed that an input signal represents a stereo image (two view images), for briefness of the description.

[Functional Structure of Stereoscopic Display Device]

Figure 3:
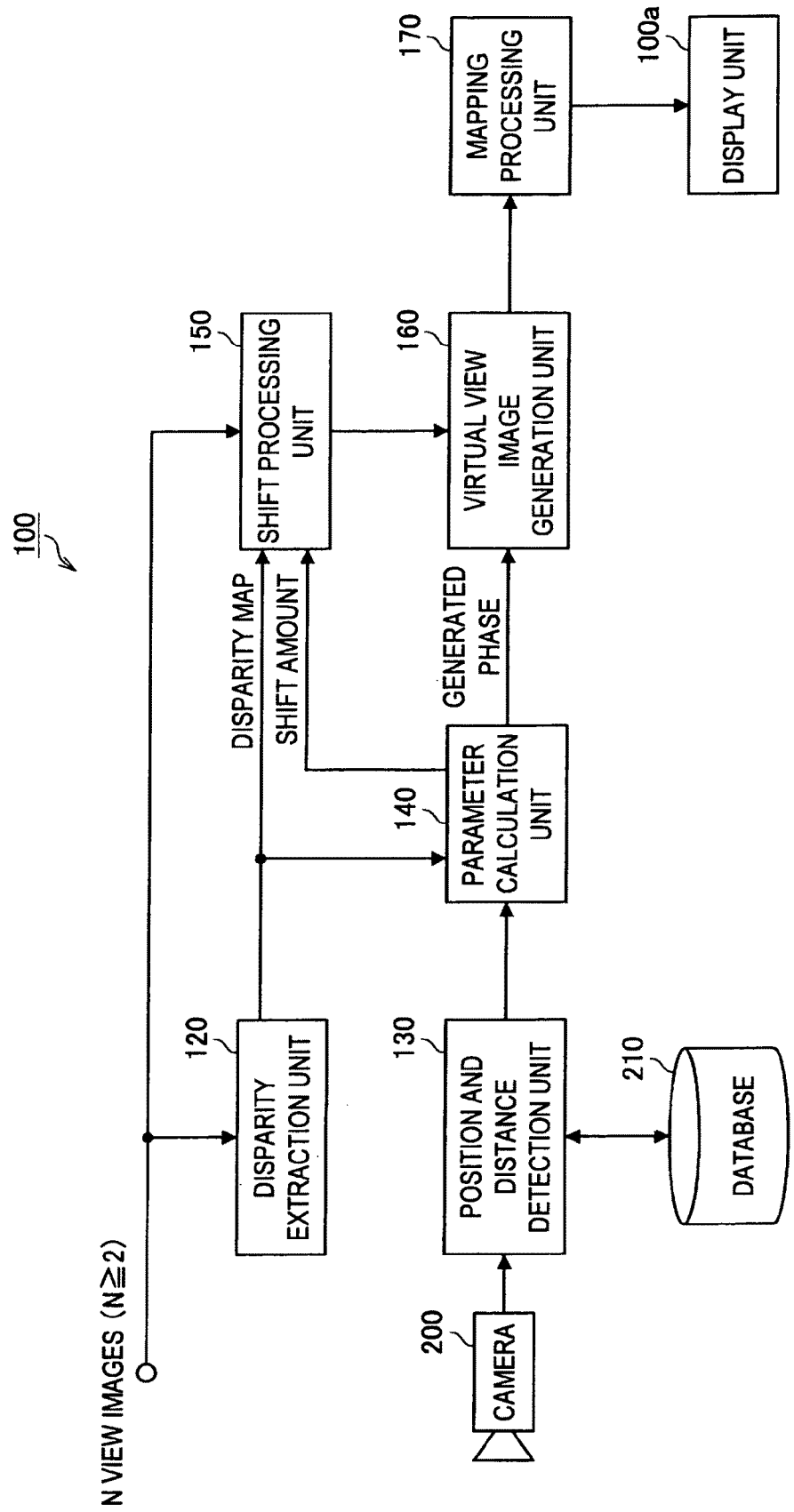
FIG. 3 is a functional configuration diagram of the stereoscopic display device according to the first and second embodiments.

A functional structure of the stereoscopic display device according to this embodiment will be described with reference to a functional block diagram in FIG. 3. The stereoscopic display device 100 in this embodiment includes a disparity extraction unit 120, a position and distance detection unit 130, a parameter calculation unit 140, a shift processing unit 150, a virtual view image generation unit 160, and a mapping processing unit 170.

The disparity extraction unit 120 performs matching point search among a plurality of view images periodically arranged in the respective pixels of the display unit 100*a*, detects a disparity d for each pixel included in one screen, and generates information on a distribution of disparities between views. A block matching method, a DP matching method, or the like may be pointed out as a method of detecting the disparity d. The method of detecting the disparity d, however, is not limited to the method mentioned above. Any one of known disparity detection methods may be employed. The DP matching method disclosed in Japanese Patent No. 4069855, for example, may be used to extract the disparity d. As described above using FIG. 2, the sign of a disparity between pixels perceived to be located in front of the display surface is negative, while the sign of a disparity between pixels perceived to be located behind the display surface is positive, when coordinates of a left image of a stereoscopic image are used as a reference.

The position and distance detection unit 130 detects whether or not a viewer is located in the orthoscopic zone using a camera 200. The camera 200 is placed at the position such as an upper part of the autostereoscopic display 100*a*, where the face of the viewer is easily detectable. Note that, although two or more cameras are generally necessary for distance measurement, it is possible to acquire distance information just with one camera by use of object recognition technology.

The position and distance detection unit 130 detects a viewer face (performs face recognition) from image data captured by the camera 200, examines in advance an average face size on an image associated with a visual distance, and records the average face size with respect to the visual distance in a database 210 or a memory not shown. The size of the detected viewer face is compared with data in the database 210 or the memory to read distance data corresponding to the detected viewer face. Positional information on the viewer and information on the distance from the display unit 100a to the viewer may be obtained. Since the installation position of the camera 200 is fixed, information on the relative position of the viewer relative to the display unit 100a may also be obtained from coordinate information on the location of the viewer face on the image. The database 210 or the memory may be included in the stereoscopic display device 100, or may be held outside the stereoscopic display device 100.

In the case of the stereoscopic display device 100 in this embodiment, positions of the pseudoscopic zone and the orthoscopic zone are known in advance. Thus, it becomes possible to detect whether or not the viewer is located in the orthoscopic zone based on information on the detected position of the viewer. The larger the number of viewpoints or a view field angle per viewpoint is, the larger the area of the orthoscopic zone is. Accordingly, highly accurate viewer position detection is not necessary.

The parameter calculation unit 140 outputs parameters of a shift amount and a generated phase, based on the information on the distribution of the disparities between the views generated by the disparity extraction unit 120 and the information on the position of the viewer detected by the position and distance detection unit 130. The parameter calculation unit 140 may calculate the shift amount based on the information on the distribution of the disparities between the views generated by the disparity extraction unit 120 and may determine the generated phase of a virtual view image based on the information on the position of the viewer.

When the viewer is located in the pseudoscopic zone, for example, the parameter calculation unit 140 may calculate a mean value of disparity values for the respective pixels included in the screen of the display unit 100a based on the information on the distribution of the disparities, as the shift amount. Alternatively, the parameter calculation unit 140 may calculate, as the shift amount, a disparity value by which the areas (number of pixels) of an image perceived to be located in front of and behind the display unit 100a are substantially equal, based on the histogram of a distribution of the disparities.

A degree of discomfort caused by the pseudoscopy depends on the magnitude of the disparity and the area of each object within the image. Even in the case of an object perceived to advance very greatly from the display unit 100a, the degree of discomfort caused by the pseudoscopy is small when the object has a small area. On the other hand, even in the case of an object perceived to advance a little from the display unit 100a, the degree of discomfort caused by the pseudoscopy may be very large when the object has a large area. Accordingly, using a shift amount obtained by adding the area of the object to a disparity value, adjustment may be made to reduce the absolute value of the disparity value while adding the area of the object. That is, the parameter calculation unit 140 may calculate a value obtained by weighting the calculated shift amount according to the area of the object in the view images, as a shift amount used for the shift processing. By taking into account of the area of an object as mentioned above, the discomfort and a degree of fatigue of a viewer caused by the pseudoscopy may be more reduced.

On the other hand, in this embodiment, when the viewer is located in the orthoscopic zone, the viewer has no discomfort caused by the pseudoscopy. Thus, the shift of zero is output, in principle. However, even if there is a disparity distribution, the mean value of the distributed disparities is sometimes zero. In that case, when it is detected that the viewer is in the pseudoscopic zone based on information on the position of the viewer, a generated phase interval is reduced such that a disparity value between virtual view videos to be generated is reduced. The discomfort caused by the pseudoscopy is thereby reduced.

When there is a plurality of viewers, it may be determined whether or not at least one of the viewers is located in the pseudoscopic zone. The discomfort caused by the pseudoscopy may be reduced by the same method as that mentioned above.

The shift processing unit 150 recreates and outputs a plurality of view images and a disparity map, based on the shift amount calculated by the parameter calculation unit 140. Each of the new view images is created just by adding an offset value corresponding to the shift amount to coordinates of the original image. Thus, the absolute value of the disparity i d may be controlled with a dynamic range of the disparity distribution maintained. Further, it is not necessary to obtain a new disparity map (or a disparity ii distribution). Disparity extraction does not need to be performed again because the calculation may be performed using an immediately precedingly calculated disparity map.

Figure 4A:
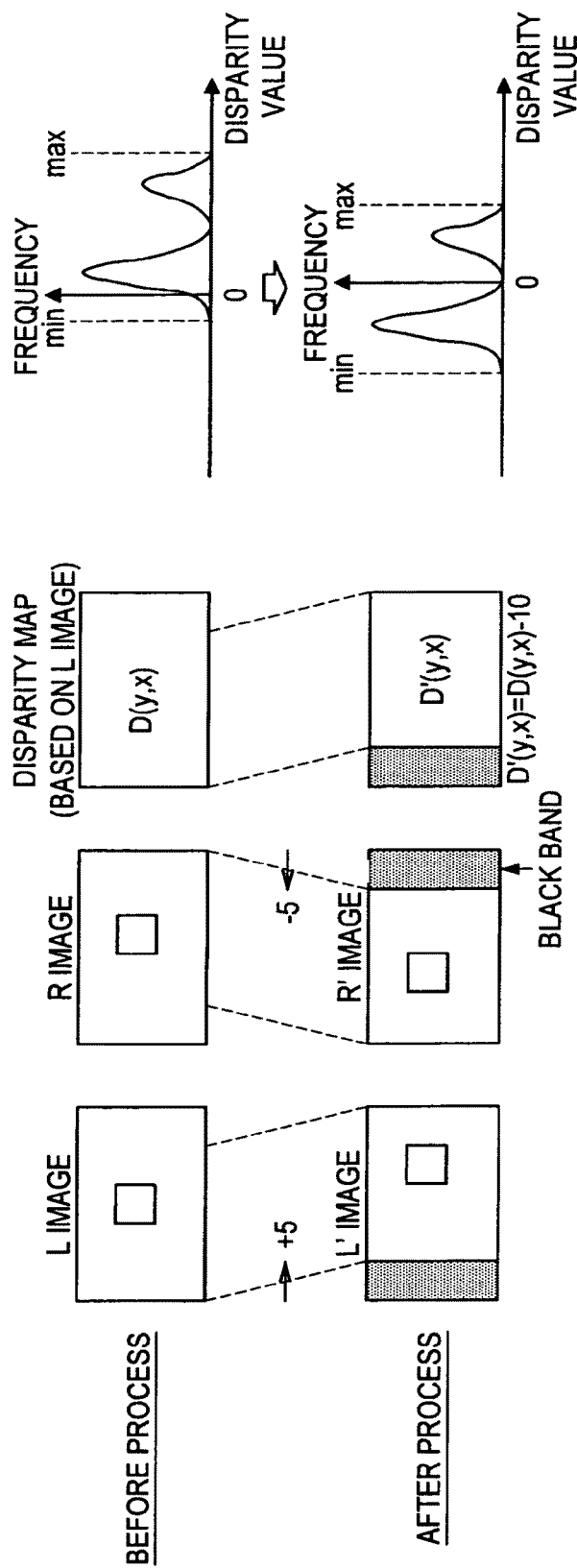
FIG. 4A is a diagram for explaining shift processing (of shifting an image so that the image appears to be located in front of a display surface) according to the first and second embodiments.
Figure 4B:
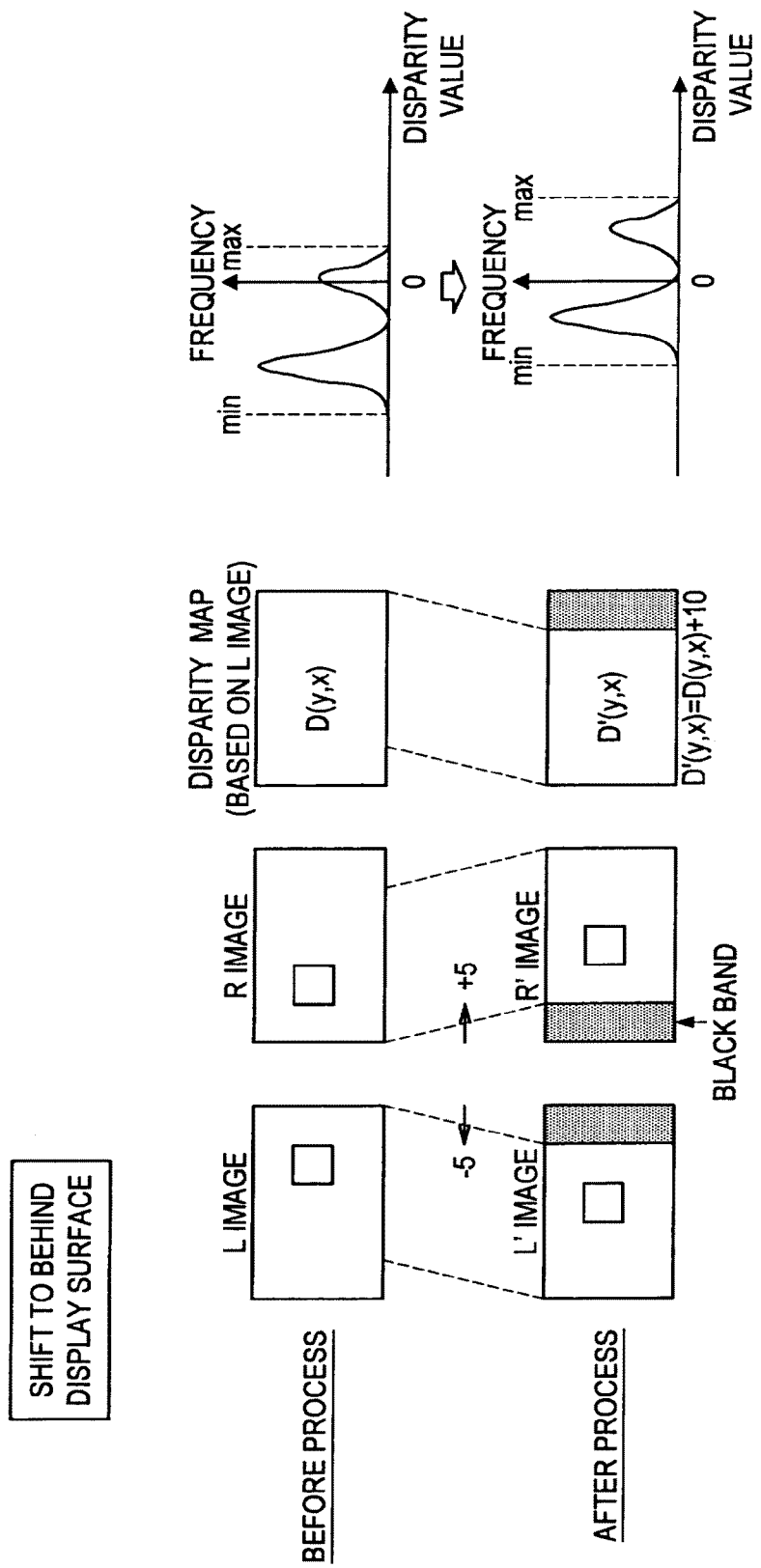
FIG. 4B is a diagram for explaining shift processing (of shifting an image so that the image appears to be located behind the display surface) according to the first and second embodiments.

An outline of the shift processing will be shown in FIGS. 4A and 4B. FIG. 4A shows a case where the shift amount is 10, while FIG. 4B shows a case where the shift amount is −10. In the shift processing, an entirety of each view image is shifted in the horizontal direction, based on the shift amount obtained by the parameter calculation unit 140. The shift processing is also performed on the disparity map in a similar manner. The size of disparity data is corrected based on the shift amount.

Specifically, when an object is to be perceived to be located in front of the display surface, a left image (L image) of the object is shifted to the right side, and a right image (R image) of the object is shifted to the left side, thereby shifting the entirety of the image of the object. When the shift amount is 10 in FIG. 4A, for example, the shift amount is positive. Thus, the image is generated by shifting the left image by five pixels to the right side and shifting the right image by −five pixels to the left side in order to cause the object perceived to be located behind the display surface to be perceived to be located in front of the display surface. The size of disparity data D' (y, x) based on the left image is obtained by adding −10 to immediately preceding disparity data D (y, x).

On the contrary, when the object is to be perceived to be located behind the display surface, a left image (L image) of the object is shifted to the left side, and a right image (R image) of the object is shifted to the right side, thereby shifting the entirety of the image of the object. When the shift amount is −10 in FIG. 4B, for example, the shift amount is negative. Thus, the image is generated by shifting the left image by five pixels to the left side and shifting the right image by −five pixels to the right side in order to cause the object which has been perceived to be located in front of the display surface to be perceived to be located behind the display surface. The size of disparity data D' (y, x) based on the left image is obtained by adding +10 to the immediately preceding disparity data D (y, x).

A black band is produced at an end of the image during the shift processing. Thus, when the shift amount is extremely large, the processing may be executed using a preset value.

The virtual view image generation unit 160 generates a virtual view image using the view images and information on a disparity distribution obtained by the shift processing. When an input image is a stereo image (composed of two view images) and the number of viewpoints of the display unit 100a is four, two view images are short. A schematic diagram of a generated phase for generating two virtual view images from the stereo image using the camera in this case will be shown in FIGS. 5A and 5B.

In the case of interpolation shown in FIG. 5A, the virtual view images are generated at positions of ⅓ and ⅔ according to the generated phase when the position of the left image in the input image is set to 0 and the position of the right image in the input image is set to 1 in order to obtain equal disparity distribution among the four views. Similarly, in the case of extrapolation shown in FIG. 5B as well, virtual view images are generated at positions of −1 and 2 according to the generated phase when the position of the left image of the input image is set to 0 and the position of the right image of the input image is set to 1 in order to obtain equal disparity distribution among the four views. Though no limitation is imposed on the method of generating a virtual view image, the method described in Japanese patent No. 4069855 or the like may be employed.

The mapping processing unit 170 rearranges data on the generated view images on the display unit 100a in accordance with the barrier period and resolution of the stereoscopic display device 100. In the case of the display unit 100a shown in FIG. 1, for example, when the resolution of the display unit 100a is the same as the resolution of each view image and when the number of viewpoints is four, the resolution per viewpoint is ¼ in the horizontal direction.

[Operation of Stereoscopic Display Device]
(Overall Operation)

Next, an overall operation of the stereoscopic display device according to this embodiment will be described hereinafter with reference to a process flow shown in FIG. 6. Referring to FIG. 6, when the process is started, the disparity extraction unit 120 extracts a distribution of disparities (disparities) between view images for the right eye and the left eye (S605).

Next, the position and distance calculation unit 130 detects the position of a viewer photographed by the camera 200 (S610). Next, the parameter calculation unit 140 determines a shift amount, based on information on the disparity distribution and information on the position of the viewer (S615). Next, the shift processing unit 150 recreates view images and a disparity map based on the shift amount and outputs the recreated view images and disparity map (S620: shift processing).

Next, the virtual view image generation unit 160 generates a virtual view image, using the view images and information on a disparity distribution obtained by the shift processing (S625). Then, the mapping processing unit 170 rearranges data on the generated view images in accordance with the barrier period and the resolution of the stereoscopic display device 100 (S630), thereby completing the process.

(Operation of Parameter Calculation Unit)

Figure 7:
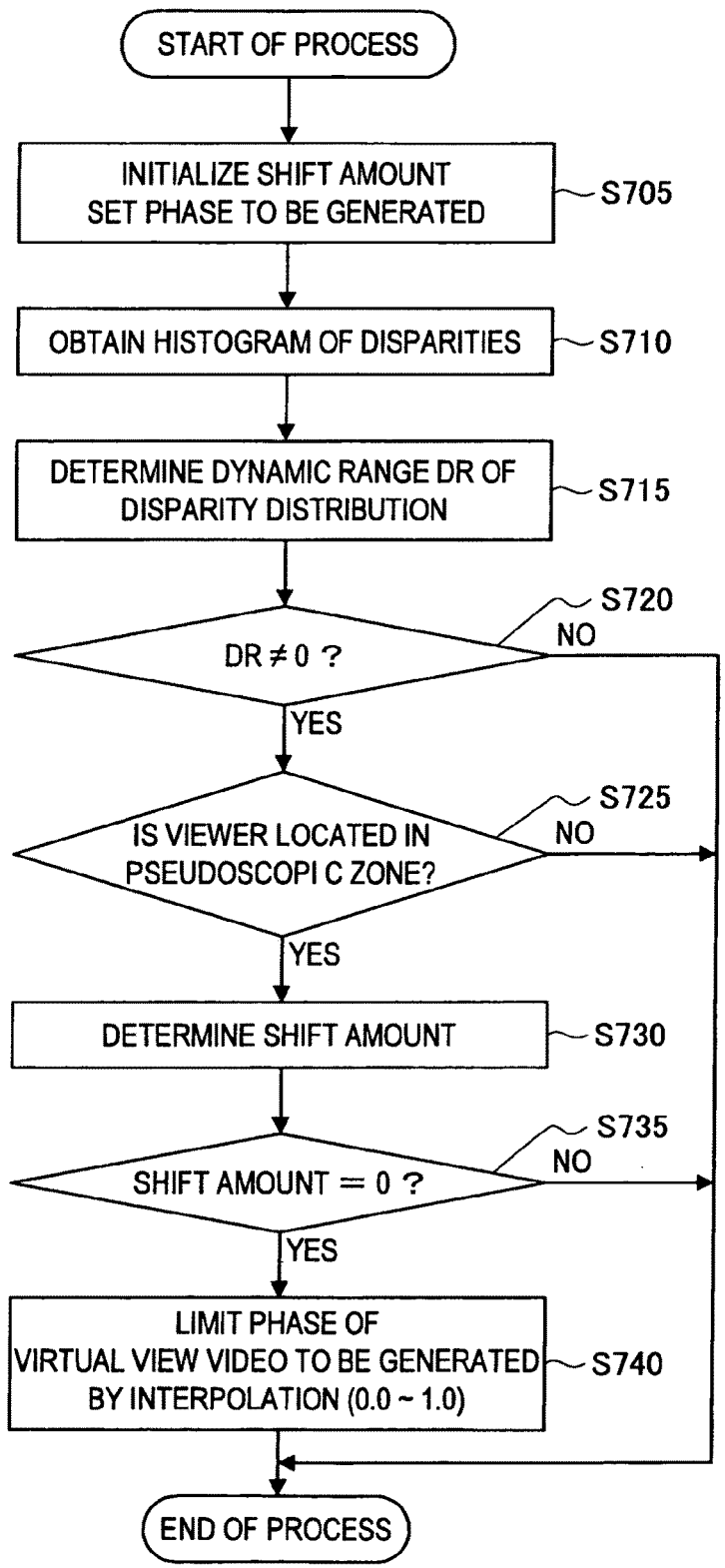
FIG. 7 is a diagram showing a process flow of a parameter calculation unit according to the first embodiment.

Now, a specific process carried out by the parameter calculation unit 140 in S615 will be described with reference to a process flow in FIG. 7. When the process in FIG. 7 is started, the parameter calculation unit 140 performs shift initialization as parameter initialization, and sets a generated phase according to the image of content.

Next, the parameter calculation unit 140 obtains a disparity histogram of the content (image) (S710). Then, the parameter calculation unit 140 obtains a dynamic range DR of a disparity distribution, or a width between a minimum value min and a maximum value max of the disparity distribution (refer to FIGS. 4A and 4B) so as to determine whether or not the content targeted for display has a disparity (S715). Next, the parameter calculation unit 140 determines whether or not the dynamic range DR is 0 (S720). When the dynamic range DR is 0, the targeted content has no disparity. Thus, the process is immediately finished.

On the other hand, when the dynamic range DR is not 0, the parameter calculation unit 140 determines that the targeted content has the disparity, and that pseudoscopy may therefore occur. The operation then proceeds to S725. Herein, it is determined that the targeted content has the disparity according to whether or not the dynamic range DR is 0. However, it may be determined that the targeted content has the disparity when the dynamic range DR is not less than a predetermined threshold, and that the targeted content has no disparity when the dynamic range DR is less than the predetermined threshold.

It is known in advance that which position relative to the position of the stereoscopic display device belongs to the pseudoscopic zone. Accordingly, the parameter calculation unit 140 may determine whether or not the viewer is located in the pseudoscopic zone, from the position of the face of the viewer detected by the camera 200. When it is determined that no viewers are located in the pseudoscopic zone, it means that all the viewers view the image in the orthoscopic zone. Thus, it is determined that there is no need for executing this process, so that the process is immediately finished.

On the other hand, when it is determined that even one of the viewers is located in the pseudoscopic zone, the parameter calculation unit 140 determines the shift amount (S730). To take an example, a disparity value having an approximately half of the cumulative frequency of the disparities may be determined as the shift amount. The parameter calculation unit 140 may determine the mean value of the distributed disparities as the shift amount. Alternatively, the parameter calculation unit 140 determines the shift amount by which the areas (the numbers of pixels) of the targeted image perceived to be located in front of and behind the display unit 100a are equal, as the shift amount.

Next, it is determined whether or not the shift amount is zero (S735). When it is determined that the shift amount is not zero, this process is immediately finished without limiting the generated phase of a virtual view image. When the shift amount is zero, the parameter calculation unit 140 limits the generated phase of the virtual view image such that the virtual view image is generated by interpolation (0.0 to 1.0). Then, this process is finished. This limitation is imposed for the following reason. That is, when the generated phase of the virtual view image is determined such that the virtual view image is generated by extrapolation shown in FIG. 5B, the virtual view image is generated outside input view image. Thus, a deviation of the image increases more. Thus, discomfort about the image may increase. On the other hand, when the generated phase of the virtual view image is determined such that the virtual view image is generated by interpolation shown in FIG. 5A, the virtual view image is generated inside the input view image. Thus, the deviation of the image is reduced more, so that the discomfort about the image is reduced. Accordingly, when the shift amount is zero, the generated phase of the virtual view image is limited such that the virtual view image is generated by interpolation by which discomfort about the image is reduced. When determining the generated phase of the virtual view image based on the calculated shift amount, the parameter calculation unit 140 makes determination according to whether or not the shift amount is zero in S735. It may also be so arranged that, when the shift amount is equal to or more than a predetermined value, the generated phase of the virtual view image is determined such that the virtual view image is generated between the input L and R images by interpolation.

As described above, according to this embodiment, based on calculated disparity information, an image is generated in which absolute values of shift amounts when the image appears to be located in front of and behind the display unit 100a have been adjusted (by the shift processing), with the dynamic range of disparities between views maintained. The absolute value of the disparity value of each view image generated by this shift processing is reduced from the absolute value of the disparity value of an original view image. Thus, discomfort about the pseudoscopic zone may be reduced more than in the original view image.

The generated phase in virtual view image generation is controlled, based on information on disparities of view images and viewer position information. Accordingly, there may be provided a stereoscopic image from which the discomfort caused by the pseudoscopy has been reduced.

Second Embodiment

In the first embodiment, only when at least one viewer is located in the pseudoscopic zone, a shift amount is adjusted, thereby reducing the discomfort about the pseudoscopy. On contrast therewith, in the second embodiment, even when a viewer is located in the orthoscopic zone or viewers are located in both of the pseudoscopic and orthoscopic zones, a shift amount is adjusted to reduce fatigue of the viewer. In this embodiment in particular, a disparity is adjusted in consideration of accumulation of fatigue of a viewer when a disparity value increases and a large individual difference of the degree of fatigue between male and female, between adult and child, or the like. Then, a stereoscopic image is recreated based on the adjustment of the disparity. A stereoscopic display device according to this embodiment will be described in detail.
[Functional Structure of Stereoscopic Display Device]

A functional structure of the stereoscopic display device 100 according to this embodiment is basically the same as the functional structure of the stereoscopic display device 100 according to the first embodiment. Therefore, a basic description will be omitted. The database 210 in this embodiment holds attribute information. The position and distance detection unit 130 registers the attribute information on a viewer in the database 210 according to an instruction of the viewer based on an operation of a remote controller or the like before a stereoscopic video is viewed. Specifically, the position and distance detection unit 130 causes the viewer to move to a position at which the camera 200 may capture the image of the viewer, performs face recognition through the operation of the remote controller by the viewer, and associates a result of the face recognition with identification information on the viewer and disparity information, for registration in the database 210. To take an example, the name of the viewer and a set value for the disparity information may be supplied by the viewer through the operation of the remote controller or the like. When a plurality of viewers is registered, priority is also registered.

Assume that faces of three people who are a father, a mother, and a child have been recognized as the result of face recognition, for example. In this case, the position and distance detection unit 130 associates and stores information on recognition of the face of the father with the name, disparity information (on a disparity level to be allowed), and priority of the father in the database 210. The name, disparity information, and priority of a viewer are examples of attribute information on the viewer. Likewise, attribute information on the mother and the child is also stored in the database 210.

When a stereostopic video is viewed, the position and distance detection unit 130 detects attribute information on a viewer by recognition of the face of the viewer. The parameter calculation unit 140 determines a shift amount based on disparity distribution information and attribute information. When the shift amount is determined, the position and distance detection unit 130 should obtain the attribute information by face recognition, and does not necessarily need information on the position of the viewer.
[Operation of Stereoscopic Display Device]

An overall operation of the stereoscopic display device according to this embodiment is the same as the overall operation of the stereoscopic display device in the first embodiment shown in FIG. 6. Thus, description of the overall operation will be omitted, and only an operation of the parameter calculation unit 140 will be described with reference to a process flow in FIG. 8.
(Operation of Parameter Calculation Unit)

Processing in S705 to S720 is the same as those in the first embodiment. That is, the parameter calculation unit 140 performs shift initialization and sets a generated phase (S705), obtains the disparity histogram of content (S710), obtains a dynamic range DR of a disparity distribution (S715), and determines whether or not the dynamic range DR is zero (S720). When the dynamic range DR is zero, the content targeted for display has no disparity. Then, this process is immediately finished.

On the other hand, when the dynamic range DR is not zero, the parameter calculation unit 140 determines a shift amount based on information on the disparity distribution and attribute information (S805). When the priority of the child is the highest among the attribute information detected from the database 210 with respect to face recognition of the farther, the mother, and the child, for example, the parameter calculation unit 140 determines the shift amount based on disparity information and the disparity distribution associated with the child.

Processing in S735 and S740 is the same as those in the first embodiment. That is, when the shift amount is zero, the parameter calculation 140 limits the generated phase of a virtual view image such that the virtual view image is generated by interpolation (0.0 to 1.0), thereby finishing this process. When the shift amount is not zero, this process is immediately finished.

As described above, according to this embodiment, disparity adjustment is made based on attribute information. In this manner, in this embodiment, disparity adjustment is made based on a person having the highest priority so as to reduce fatigue of the person having the highest priority. With this arrangement, fatigue of a viewer may be reduced in consideration of the priority of the viewer. However, the attribute information used for disparity adjustment is not necessarily limited to the priority, and the disparity may be adjusted using one of the attribute information.

According to the first and second embodiment, there may be provided a stereoscopic image from which the discomfort caused by the pseudoscopy and the fatigue at a time of viewing the stereoscopic image that may occur even in the orthoscopic zone have been reduced.

A command to each unit of the functional block according to each embodiment is executed by a dedicated control device or a CPU (not shown) that executes a program. The program for executing each processing described above is prestored in ROM or nonvolatile memory (both not shown), and the CPU reads and executes each program from such memory to thereby implement the function of each unit of the stereoscopic display device.

In the embodiments described above, the operations of the respective units are related to each other and may be replaced with a series of operations in consideration of the relation to each other. The embodiment of the stereoscopic display device can be thereby converted into the embodiment of a control method of the stereoscopic display device.

It should be understood by those skilled in the art that various modifications, combinations, sub-combinations and alterations may occur depending on design requirements and other factors insofar as they are within the scope of the appended claims or the equivalents thereof.

Although the position of a viewer or the distance from the display unit to the viewer is calculated using image processing in the above embodiments, the present disclosure is not limited to this method. To take an example, the position information and the distance information may be acquired using infrared rays or the like. Any method may be used as long as the distance from the display plane to the viewer is obtained.

Further, in the above-mentioned embodiments, although a view video guided to the right eye and a view video guided to the left eye are controlled using the lenticular lens or the parallax barrier, any other mechanism may be used as long as a stereoscopic video can be viewed with naked eyes.

It should be noted that, in this specification, the steps shown in the flowchart include not only the processing executed in chronological order according to the sequence described therein but also the processing executed in parallel or individually, not necessarily processed in chronological order. Further, the steps processed in chronological order can be performed in a different sequence as appropriate, depending on the circumstances.

The present application contains subject matter related to that disclosed in Japanese Priority Patent Application JP2010-143866 filed in the Japan Patent Office on Jun. 24, 2010, the entire content of which is hereby incorporated by reference.

What is claimed is:

1. A display device including a display unit which periodically arranges and displays a plurality of images and a light separating unit which is disposed in front of a pixel plane of the display unit and separates light from the display unit, the display device comprising:
 a disparity extraction unit configured to extract information on distribution of disparities between the view images;
 a parameter calculation unit configured to calculate a shift amount based on the information on the distribution of the disparities;
 a shift processing unit configured to perform shift processing on at least one of the view images based on the calculated shift amount; and
 a mapping processing unit configured to rearrange the shift-processed view image on the display unit,
 wherein the parameter calculation unit is configured to calculate a mean value of the disparities for respective pixels included in a screen of the display unit, based on the information on the distribution of the disparities, as the shift amount.

2. A display device including a display unit which periodically arranges and displays a plurality of images and a light separating unit which is disposed in front of a pixel plane of the display unit and separates light from the display unit, the display device comprising:
 a disparity extraction unit configured to extract information on distribution of disparities between the view images;
 a parameter calculation unit configured to perform shift processing on at least one of the view images based on the calculated shift amount; and
 a mapping processing unit configured to rearrange the shift-processed view image on the display unit,
 wherein the parameter calculation unit is configured to calculate a disparity value by which the number of pixels of an image perceived to be located in front of the display unit is substantially equal to the number of pixels of the image perceived to be behind the display unit, based on the information on the distribution of the disparities, as the shift amount.

3. The display device according to claim 1, wherein
 the parameter calculation unit calculates a value obtained by weighting the calculated shift amount according to the area of an object within the view images, as the shift amount.

4. The display device according to claim 1, further comprising:
 a detection unit configured to detect information on a position of an observer based on face recognition of the observers;
 the parameter calculation unit configured to calculate the shift amount based on the information on the distribution of the disparities and the information on the position of the observer.

5. The display device according to claim 4, wherein
 the parameter calculation unit calculates the shift amount when it is determined that at least one observer is located in a pseudoscopic zone, from the detected the information on the position of the observer.

6. The display device according to claim 1, further comprising:
 a detection unit configured to detect information on attributes of an observer based on face recognition of the observer;
 the parameter calculation unit configured to calculate the shift amount based on the information on the distribution of the disparities and the information on the attributes of the observer.

7. The display device according to claim 1, wherein
 the parameter calculation unit determines a phase to be generated of a virtual view image, based on the calculated shift amount.

8. The display device according to claim 7, wherein
 when the calculated shift amount is equal to or larger than a predetermined value, the parameter calculation unit determines the phase to be generated of the virtual view image so that the virtual view image is generated between an image for a right eye and an image for a left eye of the shift-processed view image, by interpolation.

9. The display device according to claim 8, wherein
 the parameter calculation unit determines the phase to be generated of a virtual view image based on the information on a position of an observer.

10. A display device including a light source, a display unit which periodically arranges and displays a plurality of view images, and a light separating unit which is disposed between the display unit and the light source and separates light from the light source, the display device comprising:
- a disparity extraction unit configured to extract information on a distribution of disparities between the view images;
- a parameter calculation unit configured to calculate a shift amount based on the extracted information on the distribution of disparities;
- a shift processing unit which configured to perform shift processing on at least one of the view images, based on the calculated shift amount; and
- a mapping processing unit configured to rearrange the shift-processed view image,
- wherein the parameter calculation unit is configured to calculate a mean value of the disparities for respective pixels included in a screen of the display unit, based on the information on the distribution of the disparities, as the shift amount.

11. A display device comprising:
- a display unit configured to periodically arrange and display a plurality of view images;
- a detection unit configured to detect information on a position of an observer;
- a parameter calculation unit configured to calculate a shift amount based on the information on the position; and
- a shift processing unit configured to perform shift processing on at least one of the view images based on the calculated shift amount,
- wherein the parameter calculation unit is configured to calculate a mean value of the disparities for respective pixels included in a screen of the display unit, based on the information on the distribution of the disparities, as the shift amount.

12. A display device comprising:
- a display unit configured to periodically arrange and display a plurality of view images;
- a detection unit configured to detect information on attributes of an observer;
- a parameter calculation unit configured to calculate a shift amount based on the information on the attributes; and
- a shift processing unit configured to perform shift processing on at least one of the view images based on the calculated shift amount,
- wherein the parameter calculation unit is configured to calculate a mean value of the disparities for respective pixels included in a screen of the display unit, based on the information on the distribution of the disparities, as the shift amount.

13. A control method of a display device that includes a display unit which periodically arranges and displays a plurality of images and a light separating unit which is disposed in front of a pixel plane of the display unit and separates light from the display unit, the control method comprising:
- extracting information on a distribution of disparities between the view images;
- calculating a shift amount based on the information on the distribution of the disparities;
- performing shift processing on at least one of the view images based on the calculated shift amount; and
- rearranging the shift-processed view image on the display unit,
- wherein calculating the shift amount comprises calculating a mean value of the disparities for respective pixels included in a screen of the display unit, based on the information on the distribution of the disparities.

14. The display device according to claim 10, wherein the parameter calculation unit calculates a value obtained by weighting the calculated shift amount according to the area of an object within the view images, as the shift amount.

15. The display device according to claim 10, further comprising:
- a detection unit configured to detect information on a position of an observer based on face recognition of the observers;
- the parameter calculation unit configured to calculate the shift amount based on the information on the distribution of the disparities and the information on the position of the observer.

16. The display device according to claim 15, wherein the parameter calculation unit calculates the shift amount when it is determined that at least one observer is located in a pseudoscopic zone, from the detected the information on the position of the observer.

17. The display device according to claim 10, further comprising:
- a detection unit configured to detect information on attributes of an observer based on face recognition of the observer;
- the parameter calculation unit configured to calculate the shift amount based on the information on the distribution of the disparities and the information on the attributes of the observer.

18. The display device according to claim 10, wherein the parameter calculation unit determines a phase to be generated of a virtual view image, based on the calculated shift amount.

19. The display device according to claim 18, wherein when the calculated shift amount is equal to or larger than a predetermined value, the parameter calculation unit determines the phase to be generated of the virtual view image so that the virtual view image is generated between an image for a right eye and an image for a left eye of the shift-processed view image, by interpolation.

20. The display device according to claim 19, wherein the parameter calculation unit determines the phase to be generated of a virtual view image based on the information on a position of an observer.

21. The display device according to claim 11, wherein the parameter calculation unit determines a phase to be generated of a virtual view image, based on the calculated shift amount.

22. The display device according to claim 21, wherein when the calculated shift amount is equal to or larger than a predetermined value, the parameter calculation unit determines the phase to be generated of the virtual view image so that the virtual view image is generated between an image for a right eye and an image for a left eye of the shift-processed view image, by interpolation.

23. The display device according to claim 22, wherein the parameter calculation unit determines the phase to be generated of a virtual view image based on the information on the position of the observer.

24. The display device according to claim 12, wherein when the calculated shift amount is equal to or larger than a predetermined value, the parameter calculation unit determines the phase to be generated of the virtual view image so that the virtual view image is generated between an image for a right eye and an image for a left eye of the shift-processed view image, by interpolation.

25. The display device according to claim 24, wherein the parameter calculation unit determines the phase to be generated of a virtual view image based on the information on the position of the observer.

* * * * *